(12) United States Patent \
Arnouse

(10) Patent No.: US 7,677,459 B2 \
(45) Date of Patent: *Mar. 16, 2010

(54) DUAL-SIDED SMART CARD READER

(76) Inventor: Michael Arnouse, 15 Hickory Dr., Old Brookville, NY (US) 11545

( * ) Notice: Subject to any disclaimer, the term of this patent is extended or adjusted under 35 U.S.C. 154(b) by 1199 days.

This patent is subject to a terminal disclaimer.

(21) Appl. No.: 11/021,767

(22) Filed: Dec. 23, 2004

(65) Prior Publication Data

US 2005/0139669 A1 Jun. 30, 2005

Related U.S. Application Data

(63) Continuation-in-part of application No. 11/009,820, filed on Dec. 10, 2004, now Pat. No. 6,997,381.

(60) Provisional application No. 60/532,393, filed on Dec. 24, 2003.

(51) Int. Cl. \
*G06K 19/06* (2006.01)

(52) U.S. Cl. ........................ 235/492; 235/486

(58) Field of Classification Search ................ 235/382, 235/382.5, 380, 375, 492, 486, 487 \
See application file for complete search history.

(56) References Cited

U.S. PATENT DOCUMENTS

| | | | |
|---|---|---|---|
| 4,735,578 A | 4/1988 | Reichardt et al. | |
| 4,752,234 A | 6/1988 | Reichardt et al. | |
| 4,909,742 A | 3/1990 | Ohkubo et al. | |
| 4,976,630 A | 12/1990 | Schuder et al. | |
| 5,176,523 A | 1/1993 | Lai | |
| 5,224,873 A | 7/1993 | Duffet et al. | |
| 5,225,653 A | 7/1993 | Martin et al. | |
| 5,252,815 A | 10/1993 | Pernet | |
| 5,386,104 A * | 1/1995 | Sime | 235/379 |
| 5,395,259 A | 3/1995 | Casses | |
| 5,434,395 A * | 7/1995 | Storck et al. | 235/380 |
| 5,629,508 A | 5/1997 | Findley, Jr. et al. | |
| 5,719,950 A | 2/1998 | Osten et al. | |
| 5,763,862 A * | 6/1998 | Jachimowicz et al. | 235/380 |
| 5,929,427 A * | 7/1999 | Harada et al. | 235/492 |
| 6,454,164 B1 * | 9/2002 | Wakabayashi et al. | 235/380 |
| 6,502,748 B2 * | 1/2003 | Berg et al. | 235/379 |
| 6,655,590 B1 | 12/2003 | McFeely et al. | |
| 2005/0139656 A1 * | 6/2005 | Arnouse | 235/382 |
| 2006/0219776 A1 * | 10/2006 | Finn | 235/380 |

* cited by examiner

*Primary Examiner*—Karl D. Frech \
(74) *Attorney, Agent, or Firm*—DLA Piper LLP (US)

(57) ABSTRACT

A dual-sided smart card reader, and method for operating the same, is disclosed. The dual-sided smart card reader permits the simultaneous insertion of at least two different smart cards from opposing sides. The dual-sided smart card reader may additionally include a biometric verification device, such as a fingerprint scanner, for comparing biometric information from an operator of the reader to biometric information stored on a smart card. Also, the dual-sided smart card reader may additionally include a pulse monitor, such as a sensor, to detect a pulse of an operator of the reader.

23 Claims, 7 Drawing Sheets

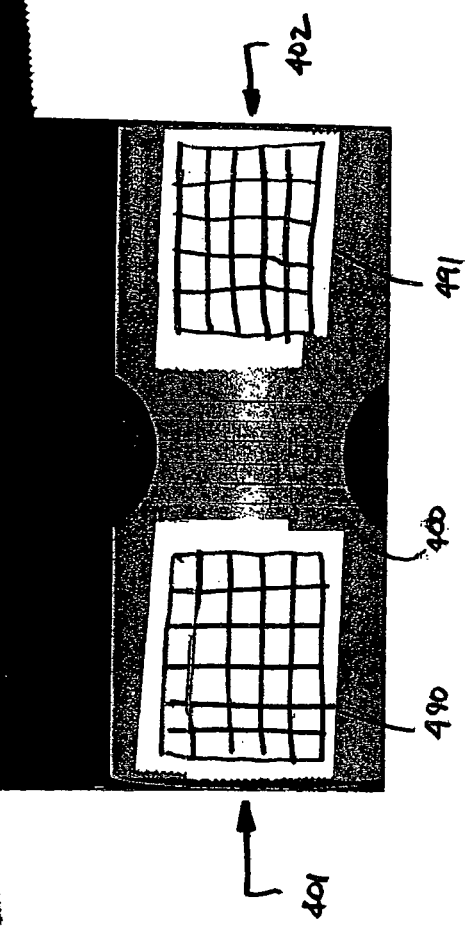

DUAL-SIDED SMART CARD READER

RELATED APPLICATIONS

The present application is a continuation in part of U.S. Pat. application Ser. No. 11/009,820 filed Dec. 10, 2004 now U.S Pat. No. 6,997,381 and claims priority to U.S. Provisional Patent Application No. 60/532,393, filed Dec. 24, 2003, the entire disclosures of which are incorporated by reference herein.

FIELD OF THE INVENTION

The present invention relates to smart card readers, and in particular to a dual-sided smart card readers.

BACKGROUND OF THE INVENTION

Smart card readers have been known for some time. However, conventional smart card readers do not provide the ability to independently verify the identity of a smart card holder. Additionally, conventional smart card readers do not permit dual-sided operation, such that at least two (2) smart cards may be inserted into a single card reader simultaneously. Finally, conventional smart card readers do not provide the ability to visually display information regarding data stored on a smart card.

Thus, there is presently a need for a smart card reader system which permits user identification, and which allows insertion of multiple smart cards simultaneously. There is also presently a need for a smart card reader system which permits the visual display of information.

SUMMARY OF THE INVENTION

An exemplary embodiment of the present invention comprises a smart card reader including a first input port disposed on a first side of the reader, and a second input port disposed on a second opposing side of the reader.

Another exemplary embodiment of the present invention comprises a smart card system including at least two smart cards, and a dual-sided smart card reader including a first input port disposed on a first side of the smart card reader, and a second input port disposed on a second opposing side of the smart card reader.

An additional exemplary embodiment of the present invention comprises a method for facilitating secure transactions including the steps of: inserting a first smart card into a first slot of a dual-sided smart card reader, inserting a second smart card into a second slot of the dual-sided smart card reader, said second slot disposed on an opposing side of the smart card reader, determining if a holder of the first smart card is authorized to access information on the second smart card, and permitting the holder of the first smart card to access information stored on the second smart card.

An exemplary embodiment of the present invention comprises a smart card reader including a first input port disposed on a first side of the reader for receiving a first smart card, a second input port disposed on a second opposing side of the reader for receiving a second smart card, and at least one biometric device for obtaining a biometric sample and/or at least one pulse sensor.

BRIEF DESCRIPTION OF THE DRAWINGS

FIG. 7 shows the dual-sided smart card reader of FIG. 1 additionally including a hand geometry scanner.

DETAILED DESCRIPTION

Figure 1:
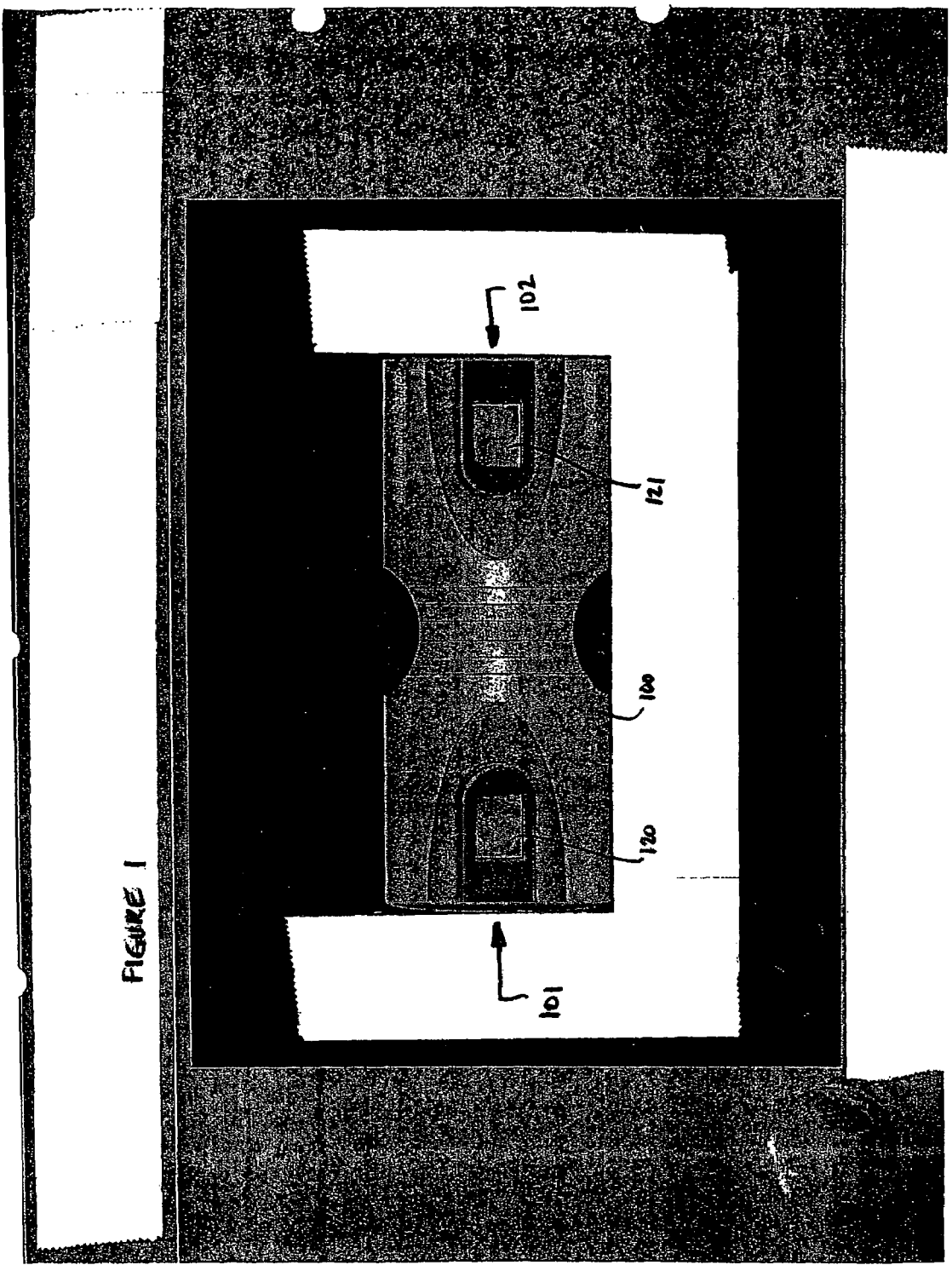
FIG. 1 shows a top view of a dual-sided smart card reader according to a first exemplary embodiment of the present invention.

FIG. 1 shows a first exemplary embodiment of the present invention comprising a dual-sided smart card reader 100 which permits the insertion of smart cards from either, or both sides thereof. The dual-sided smart card reader 100 may also include fingerprint pads 120, 121 on either, or both, sides thereof.

Figure 2:
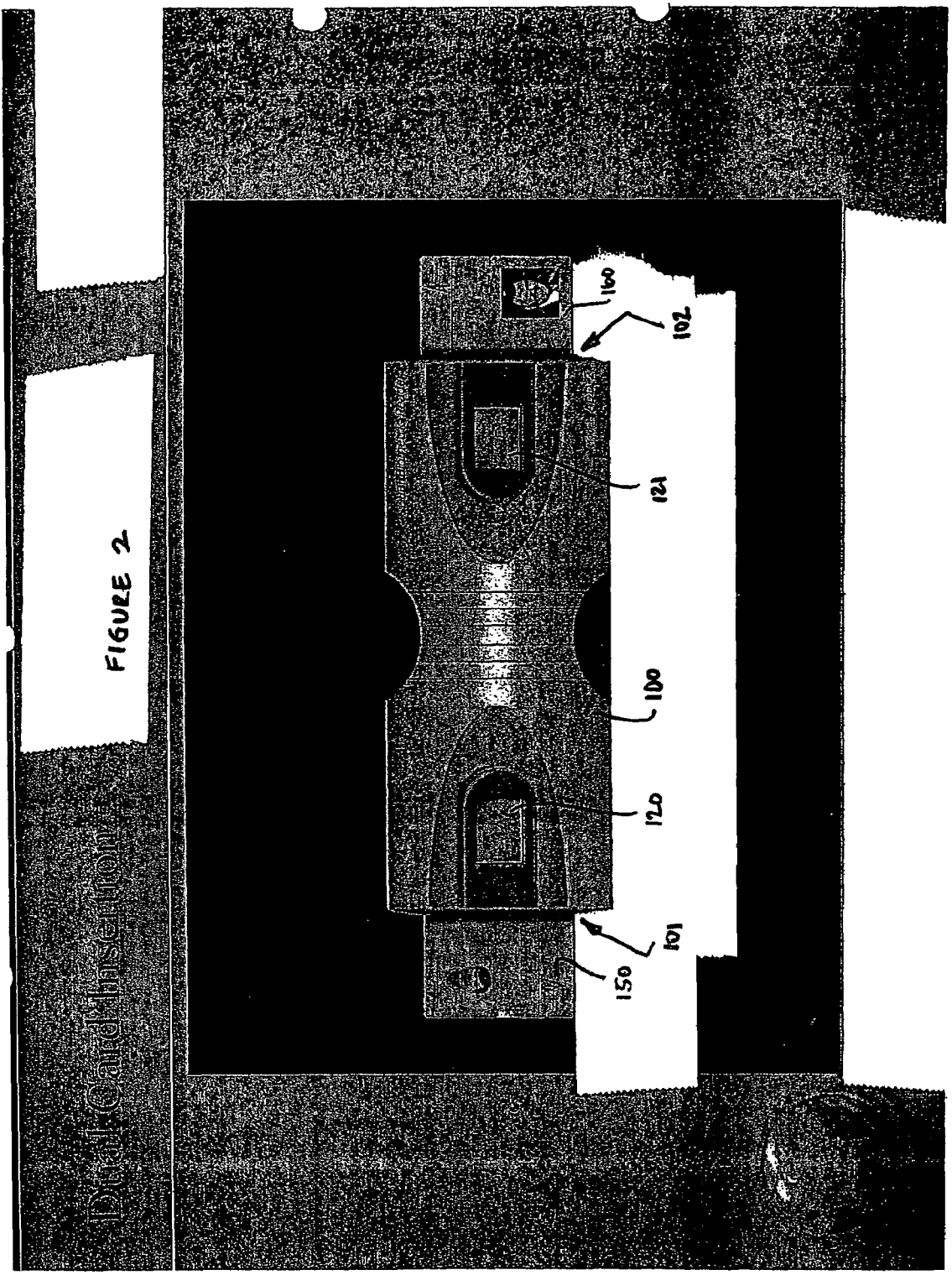
FIG. 2 shows the dual-sided smart card reader of FIG. 1 with smart cards inserted therein.

As shown in FIG. 2, the dual-sided smart card reader 100 includes first and second insertion ports 101, 102 for the insertion of first and second smart cards 150, 160. Once the smart cards 150, 160 are inserted into the reader 100, the fingerprint pads 120, 121 may be utilized to provide independent verification of the identity of the person carrying the card.

Figure 3:
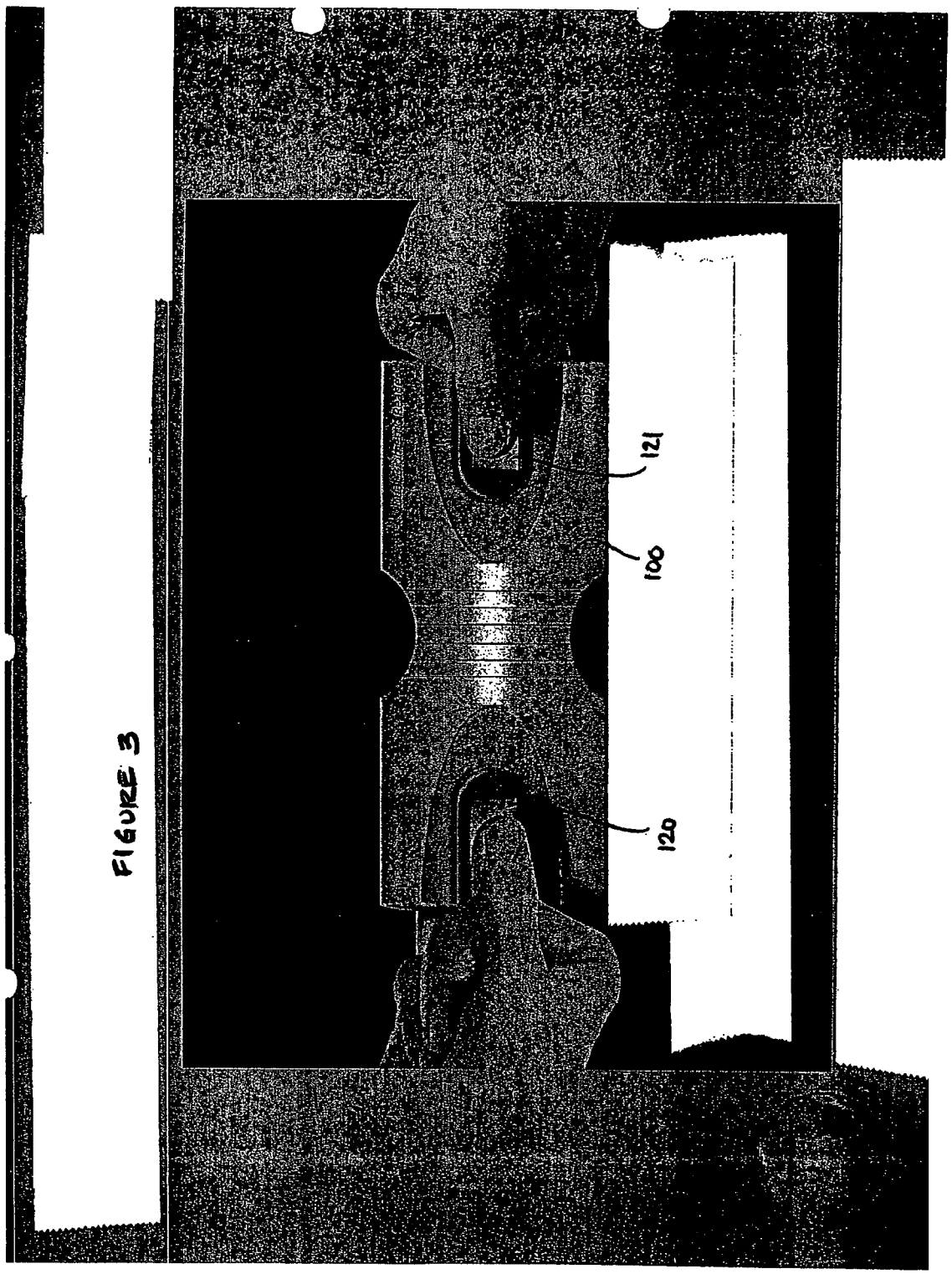
FIG. 3 shows the dual-sided smart card reader of FIG. 1 with users providing fingerprint samples.

In operation, smart card holders insert their respective smart cards 150, 160 into the respective insertion ports 101, 102 of the smart card reader 100. In addition to providing the smart cards 150, 160, a user may additionally provide some type of biometric information (e.g., a fingerprint sample) which may be used to verify the identity of the user. As shown in FIG. 3, one method of user verification may be accomplished by having the respective users of the smart cards 150, 160 place their finger or thumb on the fingerprint pads 120, 121. The fingerprint pads 120, 121 accept the fingerprint sample and electronically compare the sample to the fingerprint data stored on the user's smart card. If the fingerprint data matches, the user is verified and may continue with transactions using the card reader 100. However, if the fingerprint data does not match, the user is prohibited from using the card reader 100 further. In addition, a mechanism adapted for reading a person's pulse, such as a pulse sensor, may also be incorporated to detect and monitor the pulse of a user, to verify that the user providing biometric information is "living". In other words, the lack of a pulse is an indication that the authorized user may be dead, and an unauthorized person may be attempting to use the card reader 100, such as by placing a severed finger of the authorized user on the fingerprint pads 120 and/or 121. If there is no pulse detected, the user preferably is prohibited from using the card reader 100 further, even though there may have been a biometric match. A pulse sensor may be used in connection with just one or both of the biometric sensors. In the present embodiment, a pulse sensor may be incorporated with each of the fingerprint pads 120, 121. In this manner, the fingerprint pads 120 and 121 operate to both read the fingerprint sample of the user as well as monitor the user's pulse. Further, the pulse sensor may also operate to detect any unusual pulse reads from a user, such as any irregular, fast or slow pulse rates, which may be an indication that the user may be in a distressed state, for instance, as a result of being forced by an unauthorized person to use the card reader 100. Similar to where there is no pulse detected, the user can be prohibited from using the smart card reader 100 further where any unusual pulse reads are detected.

Figure 4:
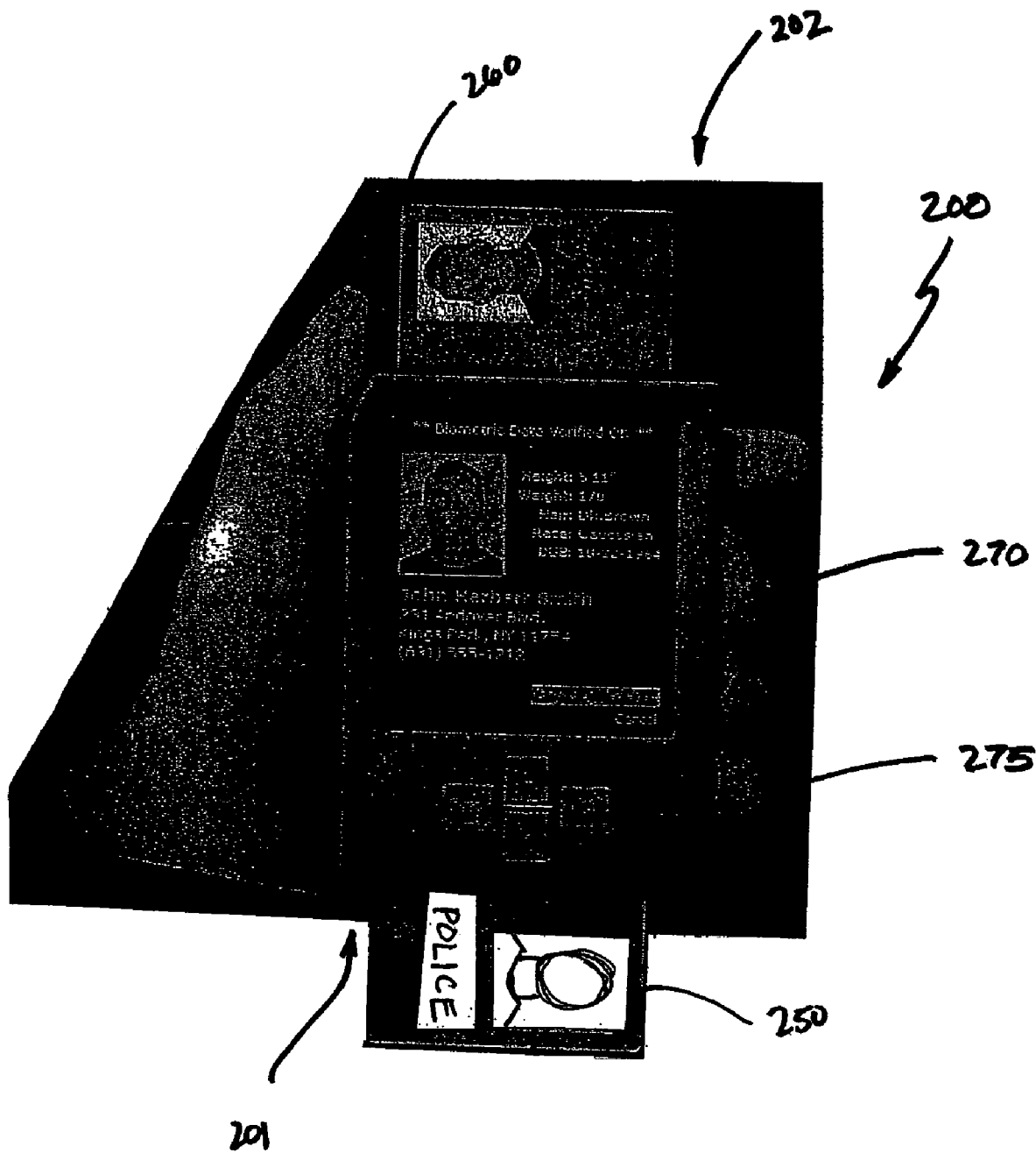
FIG. 4 shows a dual-sided smart card reader according to a second exemplary embodiment of the present invention.

In a second exemplary embodiment shown in FIG. 4, a dual-sided smart card reader 200 may include a Liquid Crystal Display (LCD), or other similar display, for displaying information to either, or both, of the users of the card reader. For example, the dual-sided smart card reader 200 may include a display screen 270 which may be viewable by one user only, thereby limiting access to information in an information sensitive environment (e.g., medical record access; police access, etc.).

As with the smart card reader 100 described above, the smart card reader 200 includes insertion ports 201, 202 for receiving smart cards 250, 260. The smart card reader 200 also includes a keypad 275 for navigating through the menus and information on the display screen 270. In the exemplary embodiment shown in FIG. 4 the smart card reader 200 does not include fingerprint pads, but those of ordinary skill in the art will realize that fingerprint pads (220, 221) may be optionally provided.

Figure 5:
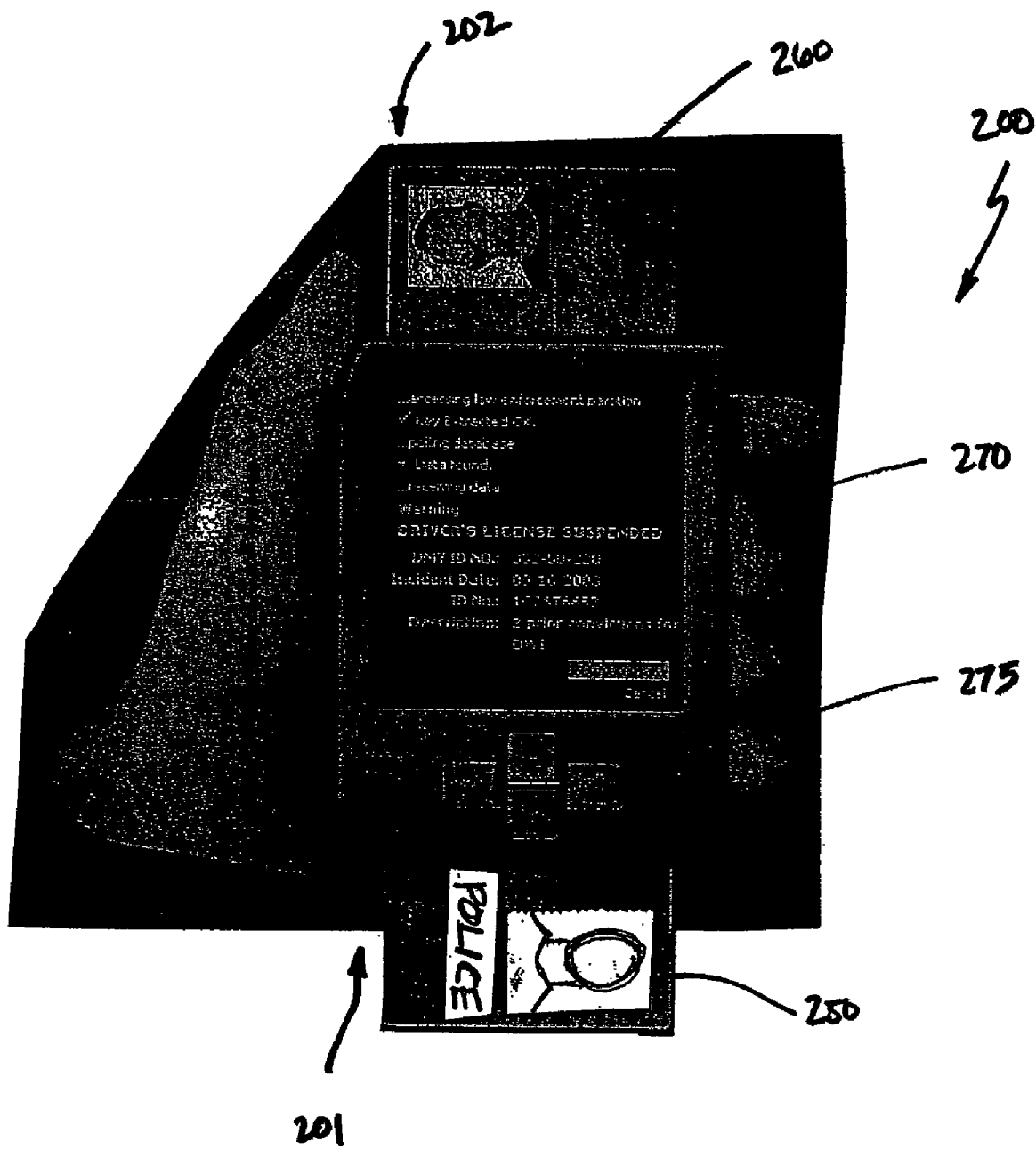
FIG. 5 shows the dual-sided smart card reader of FIG. 4 displaying confidential information.

As shown in FIG. 5, the display screen 270 may provide sensitive information to a first user whose card is inserted in the first insertion port 201 (e.g., police officer) about a second user who has his or her smart card inserted in the second insertion port 202. For example, the display screen 270 may provide information on the second user's driving and/or criminal record.

The above-described dual-sided smart card readers 100, 200 may be coupled to a personal or other computer via a Universal Serial Bus (USB) port, a FireWire™ port, a wireless transmitter, or other equivalent means disposed in, or operatively coupled, to the card reader.

Additionally, the dual-sided smart card readers 100, 200 described above may be configured to operate on battery power, or may include means for powering the card reader from a standard electrical outlet. The dual-sided smart card readers 100, 200 may also include either an internal or external power source.

Figure 6:
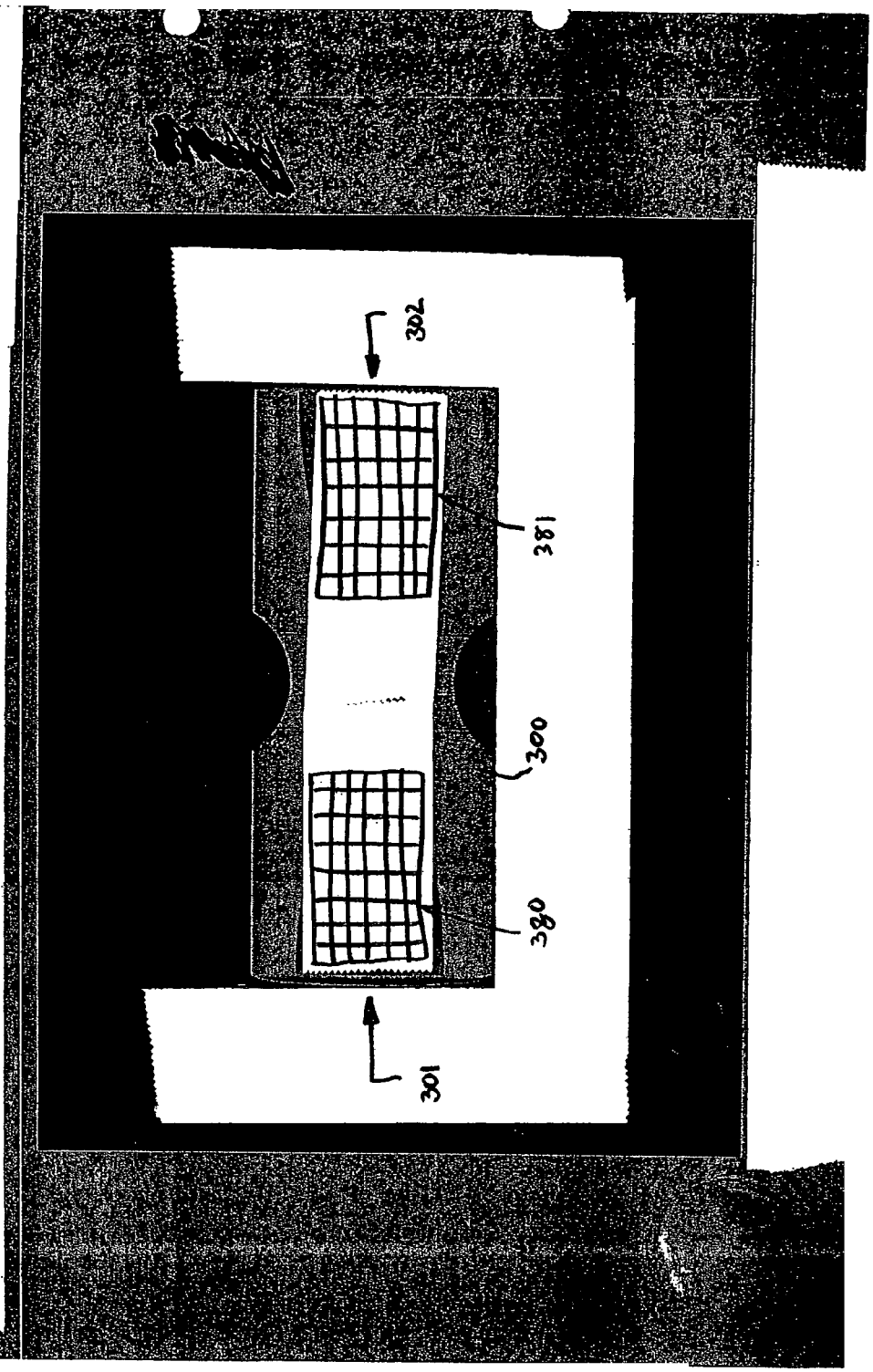
FIG. 6 shows the dual-sided smart card reader of FIG. 1 additionally including a vein scanner.

As an alternative to, or in addition to, the fingerprint pads 120, 121 (220, 221) discussed above, a dual-sided smart card reader 300 may include vein scanners 380, 381 disposed therein, or operatively coupled thereto, as shown in FIG. 6. Vein scanners may scan the pattern of veins on the back of the human hand to provide authentication, similar to a fingerprint scan. Vein scanners may be often preferred over fingerprint scanners at times because the person being scanned does not need to directly contact the unit in order to be scanned. The person being scanned merely holds their hand in close proximity to the vein scanner to be scanned (similar to scanning a bar code with an infrared bar code scanner).

As an alternative to, or in addition to, the fingerprint pads 120, 121 (220, 221) and vein scanners 380, 381 discussed above, a dual-sided smart card reader 400 may include hand geometry scanners 490, 491 disposed therein, or operatively coupled thereto, as shown in FIG. 7. Hand geometry scanners may scan (e.g., photograph) the three-dimensional shape of the human hand to provide authentication. Hand geometry scanners may be preferred over fingerprint scanners at times because the person being scanned does not need to directly contact the unit in order to be scanned. The person being scanned merely holds their hand in close proximity to the hand geometry scanner to be scanned.

Some hand geometry scanners take over ninety (90) measurements of the length, width, thickness and surface area of the hand and four fingers. The technology can use a thirty-two thousand (32,000) pixel Charge Coupled Device (CCD) digital camera to record the hand's three-dimensional shape from silhouetted images projected within the scanner. The scanner disregards surface details, such as fingerprints, lines, scars, dirt, as well as fingernails. Because the scanner uses the unique shape of the user's hand to verify identity, it can be used in machine shops, factories, manufacturing plants, and almost any industrial environment where fingerprint scanners would not be ideal. When a person uses the scanner, the scanner compares the shape of the user's hand to a template recorded during an enrollment session. If the template and the scanned hand match, identity is verified.

The above-described smart cards 150, 160 (250, 260) preferably contain multiple types of information associated with the user of the smart card. For example, the smart cards 150, 160 (250, 260) may each include two (2) distinct memory areas, one for storage of confidential information, and one for storage of biometric data (e.g., fingerprint, retina, hand geometry, etc.) associated with the user. The confidential information memory storage area may be further subdivided into separate memory compartments corresponding to separate types of information, including but not limited to: (1) a health insurance and medical record compartment, (2) a homeland security compartment (for storage of passport information and travel restrictions), (3) a financial records compartment (for storage of bank and credit card accounts), (4) a law enforcement compartments (for storage of driver's license information, criminal record, etc.), and (5) a personal storage compartment (for storage of telephone numbers, electronic documents, etc.). Preferably, each smart card reader 100, 200 would restrict access only to the memory compartment(s) necessary to accomplish certain activities (i.e., a police smart card reader would not be permitted to access medical records).

In the preferred exemplary embodiments, information stored in the confidential information memory storage of the smart cards 150, 160 area may be added, edited or deleted by any authorized smart card reader 100, 200. For example, where a smart card reader 100, 200 is used by a doctor and a patient, an authorized doctor may update the patient's medical records stored on the card.

As explained below, the dual-sided smart card readers 100, 200 may be used in various situations, such as for example, facilitating the transfer of patient medical records between health care providers, reducing or eliminating identity theft, reducing or eliminating fraud in financial and personal transactions, facilitating compliance with the Health Insurance Portability and Accountability Act (HIPAA) with regard to patient medical records, and various other environments where confidentiality of information must be maintained.

For example, generally under HIPAA: (1) patients are entitled to have access to their medical records and request amendments thereto, (2) healthcare providers must keep audit trails for patient records, (3) healthcare providers must receive patient authorization before release of medical information, and (4) healthcare providers must take care that medical information is not released for non-health related purposes. The dual-sided smart card readers 100, 200 described above can assist in accomplishing all these objectives, by for example, requiring a patient and a healthcare provider to present smart cards (and possibly verifying biometric data) before transactions regarding medical records are completed.

The dual-sided smart card readers 100, 200 are preferably used in a Provider-Consumer model. For example, before the provision of goods and/or services, a Provider inserts its card into one side of the dual-sided smart card reader 100, 200, and provides further identification (fingerprint, vein, hand, etc.), if necessary or required. The Consumer receiving these goods and/or services similarly inserts his card into the opposite side of the dual-sided smart card reader 100, 200 and provides further identification (fingerprint, vein, hand, etc.), if necessary or required. Once both the Provider and the Consumer have been verified, they can deal with each other on a fair and equal plane, without fear that one is acting in a fraudulent manner.

An exemplary situation in which the dual-sided smart card readers 100, 200 may be utilized is as follows during a medical office visit. As a prerequisite, patients are issued a smart card by a health care provider or organization (e.g., Health Maintenance Organization (HMO), Medicare, etc.) which has the capability to retain medical records and other information (e.g., insurance information). When the patient visits his or her physician, they present the smart card for insertion into one side of the dual-sided reader 100, 200. The patient may also be required to place a finger (or thumb) on a fingerprint pad on the card reader to provide further verification. As discussed above, vein and hand geometry scanners may also be utilized to provider authentication.

Similarly, the physician presents his smart card (and fingerprint, vein and/or hand, if necessary) at the opposite side of the card reader 100, 200. The card reader 100, 200 verifies the identity of the patient and the physician and permits the physician to upload medical records from the patient's card, or download medical records and/or observations to the patient's card. For example, the physician may upload observations of a physical examination to the smart card, upload a log of procedure performed and results, or download known allergy information. In this manner, a patient's confidential medical history information may be shared only with authorized physicians, and may be modified only by authorized physicians. Each upload or download is preferably marked with a date/time stamp, so that a modification 'trail' be established. A visual image may be presented on a display screen 270 coupled to the dual-sided smart card reader 200 to inform either the patient, the physician, or both, that the authentication has been successful.

If certain examinations or procedures have been performed during an office visit (and uploaded to a patient's smart card), such information may also be transmitted to the patient's insurance carrier (e.g., HMO for processing, by either the physician's office or the patient. The examination/procedure information stored on the patient's smart card, and possibly sent to the insurance carrier, may comprise Emergency/Medical (E/M) codes, diagnosis codes, fee charged, patient's name, insurance provider, insurance number, insurance provider number and other relevant data.

The above-described scenario may also take place between the patient, and a physician's various administrative personnel (e.g., nurses, billing assistants, receptionists, etc.). For example, the patient would present his smart card (and any physiologic data) at one end of the dual-sided smart card reader 100, 200 as discussed above, and the administrative user would present their smart card (and any physiologic data) at the other end of the dual-sided smart card reader. Once the patient and administrative user have been authenticated, the administrative user is permitted to access the patient's personal information, medical records, billing records, and other information on file with the physician's office. A visual image may be presented on a display screen 270 coupled to the dual-sided smart card reader 200 to inform either the patient, the administrative user, or both, that the authentication has been successful. As with the patient-physician example, each upload or download by the administrative user is preferably marked with a date/time stamp, so that a modification 'trail' can be established.

Another exemplary situation in which the dual-sided smart card readers 100, 200 may be utilized is as follows in a routine traffic stop by the police. As a prerequisite, automobile drivers are issued a driver's license in the form of a smart card. The smart card may be adapted to retain a driver's personal information (e.g., name, address, driver's license number, etc.) and driving record information (e.g., previous infractions).

When a driver is pulled over by a police officer for an infraction (e.g., speeding, etc.), the police officer requests the driver's smart card and inserts the smart card into the dual-sided smart card reader 100, 200 (at one end) along with his own identification smart card (at the opposite end) (See FIGS. 4-5). The police officer may additionally request fingerprint, vein and/or hand geometry data from the driver, as explained above, to provide further identity verification. The police officer may also be required to submit further data such as fingerprint, vein and/or hand geometry data, in order to verify his identity.

Once the police officer has been authorized to view the driver's personal and driving data, the data is presented to the police officer, preferably on a display screen 270 which forms a part of the dual-sided smart card reader 200, or is operatively coupled thereto (in the case of the smart card reader 100). In the manner, the police officer can review the driver's history of infractions, and make an informed decision on the present infraction, and the possible need for arrest. If the police officer decides to issue an infraction notice and summons (i.e., 'ticket'), the police officer can upload this information directly to the driver's smart card, thereby maintaining updated information on the driver's smart card at all times.

Although exemplary embodiments of the present invention have been discussed above utilizing fingerprint scanners, vein scanners and hand geometry scanners, it will be understood by those of ordinary skill in the art, that various types of biometric data may be utilized to confirm the identity of a user (e.g., retinal, blood, skin tissue, etc.).

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A smart card reader comprising:
   a first input port disposed on a first end of the reader adapted for receiving a first smart card;
   a second input port disposed on a second, opposed end of the reader adapted for receiving a second smart card; and
   at least one biometric device coupled to the reader,
   wherein the reader is adapted to simultaneously house multiple smart cards.

2. The smart card reader of claim 1, wherein the at least one biometric device is selected from the group consisting of at least one fingerprint pad, at least one vein recognition device and at least one hand geometry recognition device.

3. The smart card reader of claim 1, further comprising at least one pulse sensor coupled to the reader.

4. The smart card reader of claim 1, further comprising at least one display screen disposed on an outer surface of the reader.

5. A smart card system comprising:
   at least two smart cards;
   a dual-sided smart card reader including a first input port disposed on a first end of the smart card reader, and a second input port disposed on a second opposing end of the smart card reader; and at least one biometric device coupled to the reader,
wherein the reader is adapted to simultaneously house multiple smart cards.

6. A method for facilitating secure transactions comprising the steps of:
   inserting a first smart card into a first slot of a dual-sided smart card reader;
   inserting a second smart card into a second slot of the dual-sided smart card reader, said second slot disposed on an opposing end of the smart card reader;
   determining if a holder of the first smart card is authorized to access information on the second smart card; and,
   permitting the holder of the first smart card to access information stored on the second smart card.

7. The method of claim 6, comprising the further step of: verifying the identity of the holder of one or both of the first smart card and the second smart card through a biometric comparison.

8. The method of claim 7, comprising the further step of: detecting the pulse of the holder of one or both of the first smart card and the second smart card.

9. A smart card reader comprising:
   a first input port disposed on a first end of the reader for receiving a first smart card;
   a second input port disposed on a second opposing end of the reader for receiving a second smart card;
   a display screen disposed on an outer surface of the reader for displaying information stored on one of the first or second smart cards; and,
   at least one biometric device for obtaining a biometric sample.

10. The smart card reader of claim 9, wherein the display screen is configured for displaying information stored on one of the first or second smart cards to a single card holder, said single card holding providing one of the first and second smart cards.

11. The smart card reader of claim 9, further comprising at least one pulse sensor.

12. The smart card reader of claim 11, wherein the at least one biometric device comprises a fingerprint scanner.

13. The smart card reader of claim 12, wherein said fingerprint scanner operates to obtain a fingerprint sample from the holder of the first smart card, and compare said fingerprint sample to fingerprint data stored on the first smart card, and wherein the at least one pulse sensor operates to monitor the pulse of the holder of the first smart card, and detect at least one of the presence of a pulse, lack of a pulse or an irregular pulse.

14. The smart card reader of claim 13, wherein if the fingerprint sample matches the fingerprint data, the identity of holder of the first smart card is verified.

15. The smart card reader of claim 9, wherein the at least one biometric device comprises two fingerprint scanners disposed on opposing sides of the smart card reader.

16. The smart card reader of claim 15, further comprising two pulse sensors, with each pulse sensor associated with one of the two fingerprint scanners.

17. The smart card reader of claim 16, wherein said fingerprint scanners operate to obtain fingerprint samples from the holders of the first and second smart cards, and compare said fingerprint samples to fingerprint data stored on the first and second smart cards, and wherein the two pulse sensors operate to monitor the pulse of the holders of the first and second smart cards, and detect at least one of the presence of a pulse, lack of a pulse or an irregular pulse.

18. The smart card reader of claim 17, wherein if the fingerprint samples match the fingerprint data, the identities of the holders of the first and second smart cards are verified.

19. A smart card reader adapted for a transaction comprising:
   a first input port for receiving a first smart card;
   a second input port for receiving a second smart card, said second input port being positioned at an end of the reader that is opposed to that of the first input port;
   at least one biometric reader for verifying the identity of a user; and
   at least one pulse sensor to detect at least one of the presence of a pulse, lack of a pulse or an irregular pulse of a user;
   wherein biometric information read by the at least one biometric reader is compared against stored user biometric information to verify the identity of the user;
   wherein the smart card reader identifies the occurrence of at least one of:
      biometric information of the user read by the at least one biometric reader does not match any of the stored user biometric information; and
      the at least one pulse sensor does not detect any pulse of the user.

20. The smart card reader of claim 19, wherein the stored user biometric information is stored on the smart card.

21. The smart card reader of claim 19, further comprising a screen for displaying information regarding data stored on the smart card.

22. The smart card reader of claim 19, further comprising a second biometric reader for verifying the identity of a second user and a second pulse sensor associated with the second biometric reader to detect at least one of the presence of a pulse, lack of a pulse or an irregular pulse of a user.

23. The smart card reader of claim 19, wherein the smart card reader terminates a transaction on occurrence of at least one of:
   biometric information of the user read by the at least one biometric reader does not match any of the stored user biometric information; and
   the at least one pulse sensor does not detect any pulse of the user.

* * * * *